(12) United States Patent
Blossé et al.

(10) Patent No.: US 11,662,047 B2
(45) Date of Patent: May 30, 2023

(54) PIPE CONNECTION SYSTEM AND METHOD FOR PRODUCING A PIPE CONNECTION

(71) Applicant: PIPE-AQUA-TEC GMBH & CO.KG, Mannheim (DE)

(72) Inventors: Robert Blossé, Fürstenwalde (DE); Susanne Leddig-Bahls, Rustow (DE); Sven Loogen, Dortmund (DE); Jens Wahr, Duisburg (DE)

(73) Assignee: Pipe-Aqua-Tec GmbH & Co. KG, Mannheim (DE)

( * ) Notice: Subject to any disclaimer, the term of this patent is extended or adjusted under 35 U.S.C. 154(b) by 55 days.

(21) Appl. No.: 17/049,131

(22) PCT Filed: Apr. 24, 2019

(86) PCT No.: PCT/EP2019/060463
§ 371 (c)(1),
(2) Date: Oct. 20, 2020

(87) PCT Pub. No.: WO2019/206962
PCT Pub. Date: Oct. 31, 2019

(65) Prior Publication Data
US 2021/0239251 A1 Aug. 5, 2021

(30) Foreign Application Priority Data
Apr. 25, 2018 (DE) ...................... 10 2018 109 998.3

(51) Int. Cl.
*F16L 41/12* (2006.01)
*F16L 41/14* (2006.01)

(52) U.S. Cl.
CPC ............... *F16L 41/12* (2013.01); *F16L 41/14* (2013.01)

(58) Field of Classification Search
CPC . F16L 41/14; F16L 41/04; F16L 41/06; F16L 41/065
See application file for complete search history.

(56) References Cited

U.S. PATENT DOCUMENTS 3,514,129 A * 5/1970 Holdren ................ F16L 37/008
403/243
3,967,839 A * 7/1976 Dunmire ................. F16L 41/12
285/330

(Continued)

FOREIGN PATENT DOCUMENTS

DE 9316819 U1 1/1994
DE 19531913 A1 3/1996
(Continued)

*Primary Examiner* — Zachary T Dragicevich
*Assistant Examiner* — Alexander T Rufrano
(74) *Attorney, Agent, or Firm* — Wood, Phillips, Katz, Clark & Mortimer

(57) ABSTRACT

A system and method of use thereof to produce pipe connections to conduits which have been remediated using a liner. A pipe clamp is attached after a bore has been made and is secured with a clamping strap, for example. A pipe connection adapter with a flange collar and a seal arranged thereon is introduced from the inside of the pipe. An anti-rotation device between the pipe clamp and the pipe connection adapter ensures that the latter assumes a precisely defined position, such that a flange collar, with a shape corresponding to the intersection curve of the conduit/bore, provides a seal on the liner exactly on the edge of the bore. Connection can also be made from the outside of the conduit.

11 Claims, 4 Drawing Sheets

(56) References Cited

U.S. PATENT DOCUMENTS

| | | | | |
|---|---|---|---|---|
| 4,441,744 A | * | 4/1984 | Oostenbrink | F16L 37/008 |
| | | | | 277/621 |
| 4,637,638 A | * | 1/1987 | Rush | F16L 31/02 |
| | | | | 285/139.3 |
| 4,887,851 A | * | 12/1989 | Rush | F16L 31/02 |
| | | | | 285/200 |
| 5,096,232 A | * | 3/1992 | Fond | F16L 41/14 |
| | | | | 285/133.4 |
| 6,179,340 B1 | * | 1/2001 | Adolf | F16L 37/008 |
| | | | | 439/555 |
| 6,289,936 B1 | | 9/2001 | Berg | |
| 6,394,690 B1 | * | 5/2002 | Bartholoma | H02G 3/0616 |
| | | | | 403/290 |
| 7,341,286 B2 | * | 3/2008 | Andre | F16L 37/091 |
| | | | | 285/104 |
| 7,597,361 B2 | * | 10/2009 | Theilen | A01G 25/092 |
| | | | | 285/139.2 |
| 9,096,990 B2 | * | 8/2015 | Sayre | E02F 9/2275 |
| 9,130,362 B2 | * | 9/2015 | Bingham, Jr. | H02G 3/22 |
| 10,094,503 B2 | * | 10/2018 | Kelk | F16L 41/14 |
| 10,697,573 B2 | * | 6/2020 | Bassett | B25B 13/48 |
| 11,079,055 B2 | * | 8/2021 | Bontus | F16L 41/10 |

FOREIGN PATENT DOCUMENTS

| | | | | |
|---|---|---|---|---|
| DE | 19805362 A1 | | 8/1999 | |
| DE | 19933977 A1 | | 2/2001 | |
| DE | 20305736 U1 | | 6/2003 | |
| DE | 102006004797 B3 | | 9/2007 | |
| DE | 10 2008 000049 A1 | | 7/2009 | |
| DE | 20 2016 1 06327 U1 | | 11/2016 | |
| DE | 202016106327 U1 | * | 1/2017 | |
| EP | 0 339156 A2 | | 11/1989 | |
| EP | 0603775 A1 | | 6/1994 | |
| EP | 2048426 A2 | | 4/2009 | |
| GB | 1313069 A | * | 4/1973 | |
| JP | 3 620911 B2 | | 2/2005 | |
| WO | WO-9945307 A1 | * | 9/1999 | F16L 41/14 |
| WO | WO-2014085867 A1 | * | 6/2014 | F16L 41/14 |

* cited by examiner

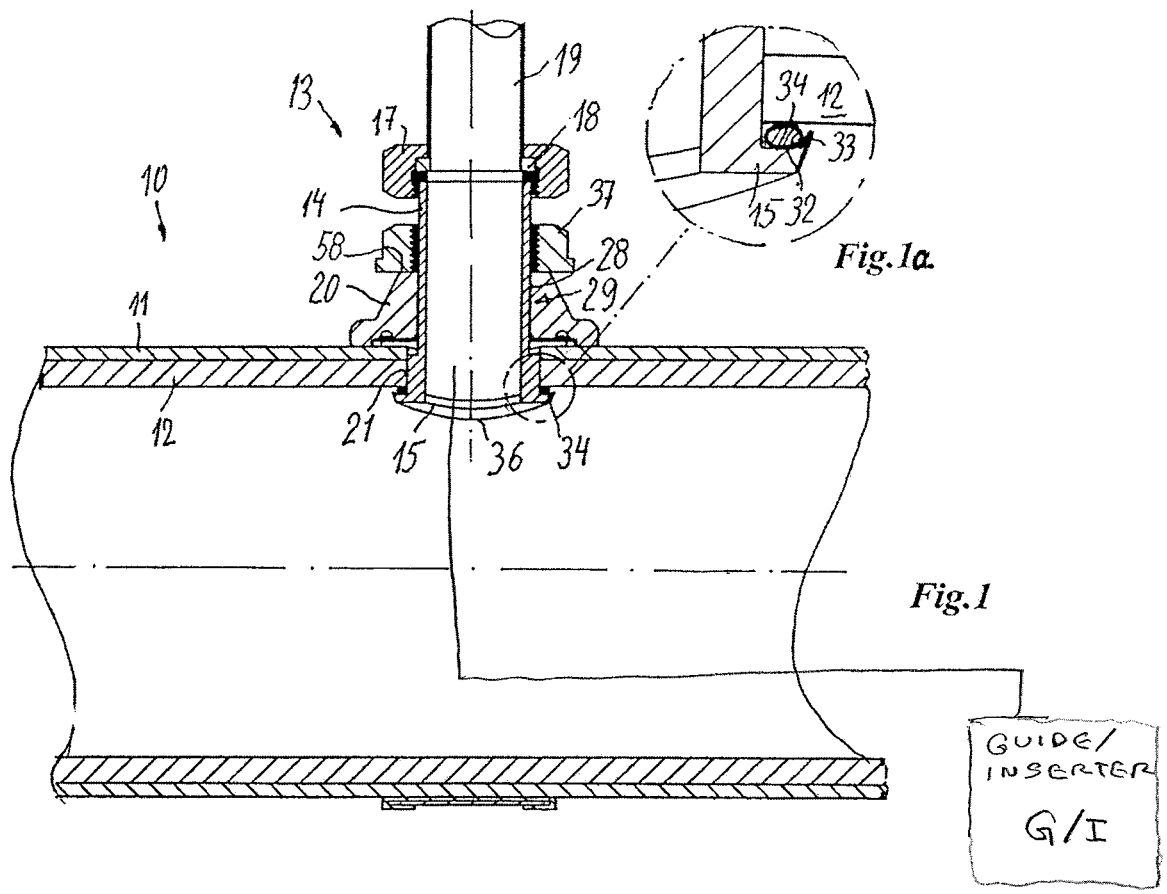
*Fig.1a.*
*Fig.1*
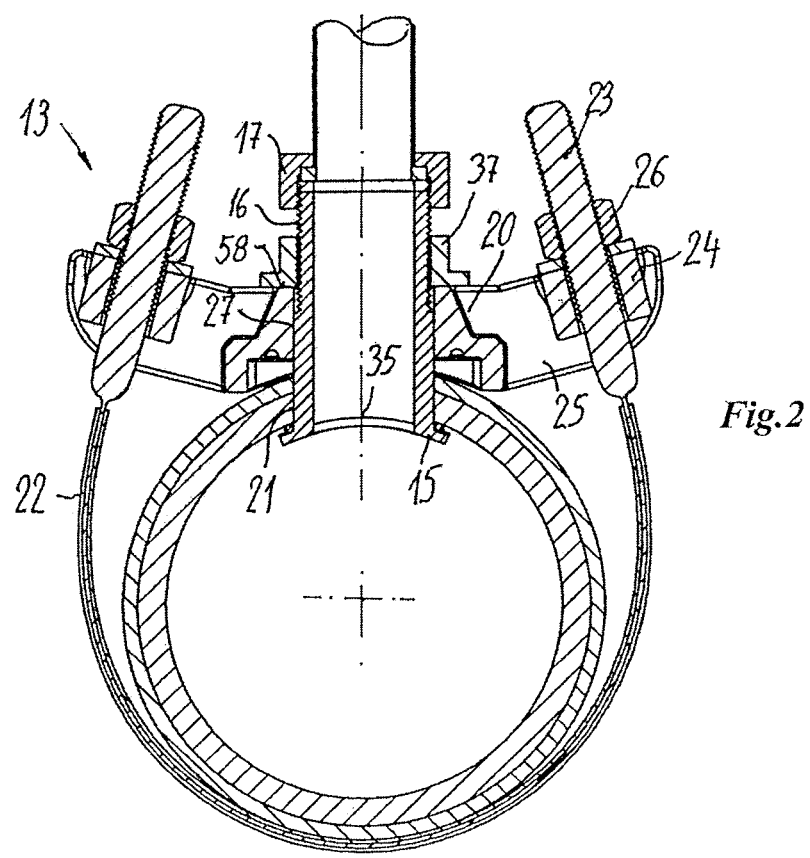
*Fig.2*

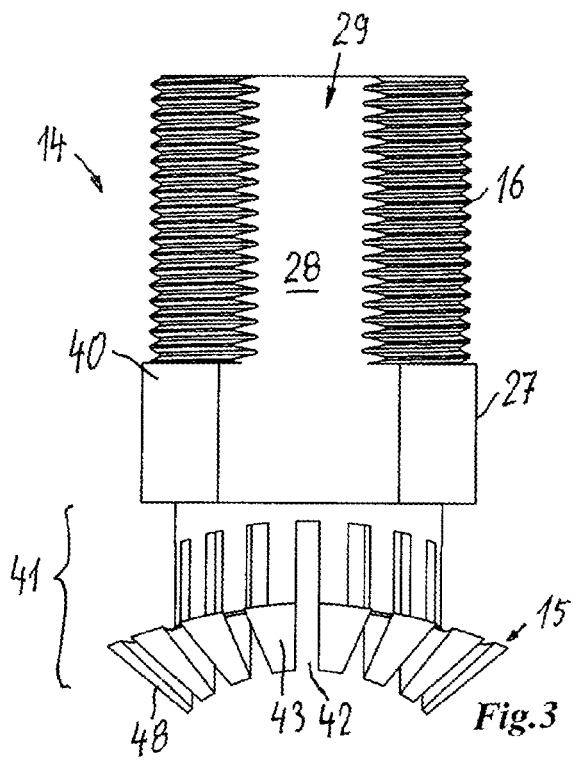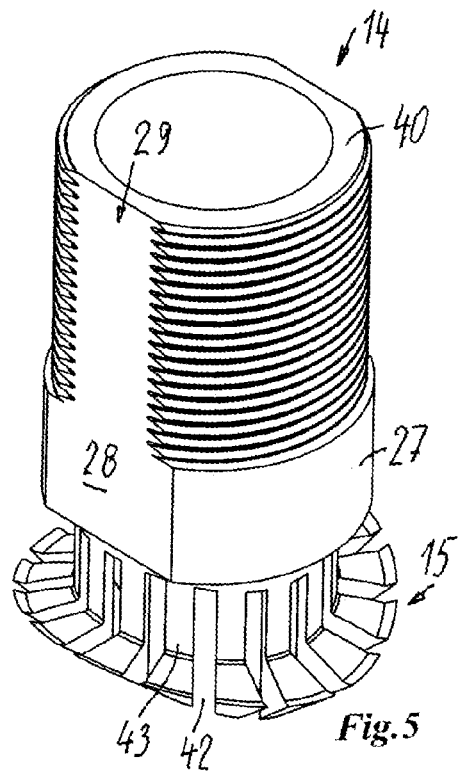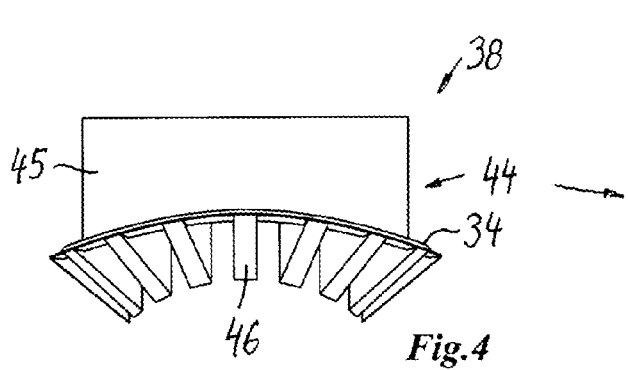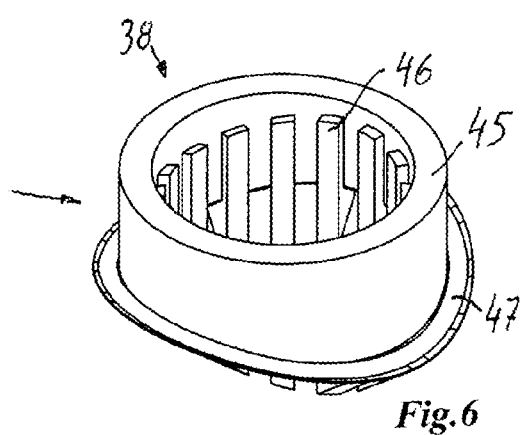

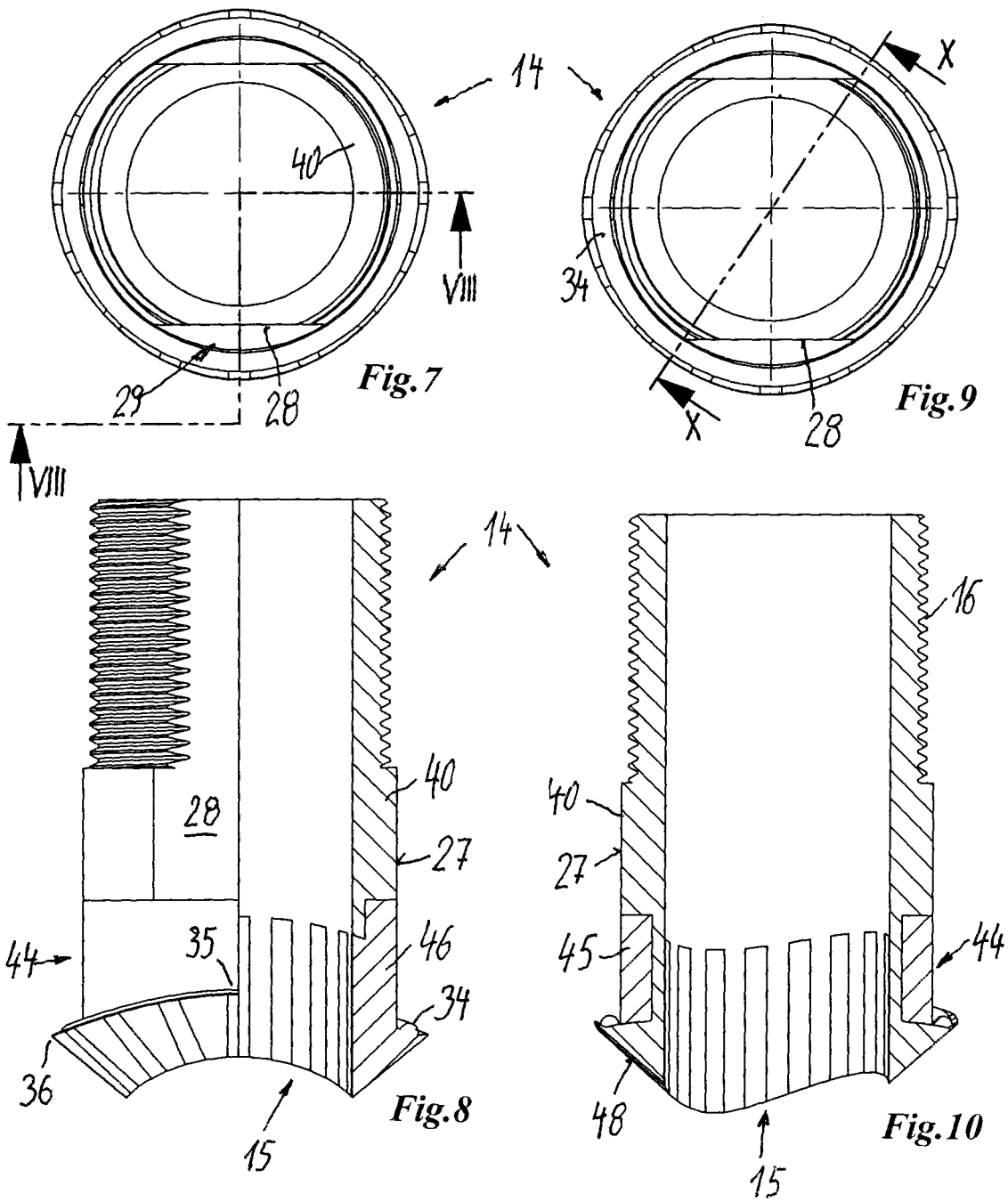

PIPE CONNECTION SYSTEM AND METHOD FOR PRODUCING A PIPE CONNECTION

FIELD OF APPLICATION AND PRIOR ART

The invention relates to a pipe connection system, having a pipe clamp to be placed on the outside of a pipe which is equipped with a liner, a pipe connection adapter which penetrates a bore in the multilayer wall of the pipe, can be connected to a connecting pipe, and has a flange collar with a diameter greater than that of the bore, and a seal between the inner wall of the conduit and the pipe connection adapter. A method for producing such a pipe connection is also proposed.

It is frequently necessary to connect branch lines, for example for a house connection, to existing drinking water supply lines or the like, particularly when old pipes are remediated with an inner lining—a so-called liner. For this purpose, a pipe clamp or tapping saddle is placed on the pipe; after the bore has been made, depending on the pipe material, a borehole sleeve or borehole sealing sleeve is put in place and provides its seal directly in the borehole. There are many types of tapping saddles in use, varying with regard to their structural design and the resulting possible applications. These differences relate to the different materials and the specific design of the supply line, to their nominal widths and/or the nominal width of the branch line, and also particularly to whether the design includes an auxiliary/operational shut-off, with or without an integrated drill bit/cutting bit.

The known tapping saddles ensure seal tightness during the drilling of single supply lines with a single-layer wall, such as steel or plastic pipes, via sleeves that seal in the borehole. Additional designs include, for example, DE 195 31 913 A1 and DE 196 23 004 A1, where the connection to a supply line made of plastic is sealed by heating the tapping saddle, which is also made of plastic, on its pipe contact surface (melting it onto the pipe). Also, in DE 198 05 362 A1, the outer surface is sealed by a sealing element, seated in a groove, in the contact region of the tapping saddle.

However, when a multi-layer supply line is tapped, in the region of the resulting cut surface of the bore, the boundary surfaces of the sectioned layers of the pipe wall are exposed; the medium can penetrate at this point and flow between two adjacent layers of the pipe wall (leakage). Various design measures are known to prevent possible infiltration and/or damage to an internal or external protective layer of the supply line.

In EP 2 048 426 A1, analogously to DE 196 23 004 A1, in the case of a two-layer or multi-layer plastic conduit (a composite depending on production conditions), the saddle piece is placed on the main line and heated to produce a material bond. However, the gap that arises between the layers during drilling is sealed by an integrated heating element in the drill bit melting the region of the borehole wall, so that the melted plastic seals the gap after cooling.

DE 93 16 819 U1 describes a solution for metallic conduits having an outer and an inner protective layer made of cement. The seal is made on the borehole wall via a radially-acting annular seal which can be inserted into the borehole when not under stress. It produces a radially-acting seal on the borehole wall when tensioned through a relative movement of two threaded sleeves in a sleeve system.

DE 199 33 977 A1 describes fixing a connecting pipe to a main pipe (supply pipe) that has been remediated using a relining pipe made of plastic material. The tapping and connection of the branch pipe is done before the relining pipe is pulled in. After the liner has been drawn in and adjusted to the main pipe wall, the bore is located from the inside and an opening is created in the relining pipe by heating it with a heating head, and then widening and pressing the relining material onto the region of the bore and the internal region of the connecting pipe. The fact that the seal is made without additional material is emphasized. A special approach device (robot) is described for locating the bore and for the subsequent work steps. The method is limited to pipes with free liners, since the liner must be movable independently of the actual outer wall. As such, the method cannot be used for a multi-layer pipe in which the layers form a solid composite (with a material bond).

DE 203 05 736 U1 describes a tapping saddle for conduits with one or more inner or outer layers of cement or the like. The seal is made via a fitting connected to the saddle and projecting into the borehole as a sealing sleeve, which itself is formed from an outer sleeve and an inner sleeve which can be screwed into the outer sleeve. A sealing element is arranged on the inner sleeve, and is supported axially on the outer sleeve and the inner sleeve. The sealing element implements the seal through radial expansion of the sealing element when the two sleeves are screwed together. The seal on the outer side of the main pipe is made by the deformation of a sealing element when the tapping saddle is tightened.

DE 10 2006 004 797 B3 describes a closure fitting for preferably metallic conduits, in particular having one or more inner layers of cement or the like, which also consists of an outer sleeve with an inner thread and an inner sleeve which can be screwed into it with a corresponding external thread. A sealing element arranged between the pipe bore wall and the inner sleeve is squeezed and seals the borehole by its radial deformation when the two sleeves are screwed relative to each other.

DE 20 2016 106 327 U1 describes a borehole sealing sleeve for a conduit, having an outer sleeve with a sleeve head which forms an outer shoulder which is elastically deformable in the radial direction, and having a dimensionally stable inner sleeve. A sleeve head is formed on the front end of the outer sleeve, and has a shoulder facing the rear end of the outer sleeve, which later serves as a contact surface. The sleeve head has a larger diameter than the inner diameter of the sleeve and is elastically deformable, and has slots that allow it to be guided through the sleeve when it is compressed. These resume their original shape on the inner wall of the pipe due to springback, and thus seal the borehole. An annular seal is arranged between the pipe outer wall and the tapping band.

EP 0 603 775 A1 describes a drain pipe that can be connected at different angles, the main pipe being a sewer pipe made of concrete and an inner plastic pipe. The described sealing system includes a seal retaining chamber with a specially designed, turned-in annular seal with a sealing lip. The annular seal is angular and is designed with a thickening, such that it forms an outward bead when it penetrates into the pipe space, and seals the bore as a result of the axial tightening. The system is tensioned and the bore is additionally sealed from the outside with synthetic foam.

EP 2 048 426 A2 describes a tapping saddle which has means in the region of the drill bit to close at least one gap between two adjoining layers of the multi-layer wall, said gap produced by the drilling in the region of the cut surface of a tapped, multi-layer conduit. The invention includes a heating coil integrated into the drill bit which, after the drilling process, seals the pipe wall by melting in the region of the cut surface. This design is in-tended for two-, three- or multi-layer conduits made of thermoplastics. A multilayer conduit is understood in this case to mean that the layers form a composite as a result of the production process—that is, they are produced with a material bond. The external sealing is carried out similarly to EP 2 048 426 A1, by melting a contact area of the saddle piece onto the pipe surface as a form-fitting connection.

Problem and Solution

The object of the invention is to create a pipe connection system which enables a connecting pipe to be attached reliably and easily, at the same time creating not only a seal with respect to the outside of the pipe, but also protection against leakage into the multilayer wall—that is, the medium penetrating between the pipe and the liner.

This problem is solved by the flange collar having the shape of an intersection curve from the bore in the conduit on its side facing the liner in the circumferential direction of the flange collar, and by the pipe connection adapter having an anti-rotation device with respect to the pipe clamp.

As such, in the invention, neither is the seal tightness dependent on the seal providing a full seal on the inner wall of the bore—that is, the cut surface in the multilayer conduit—nor does the seal have to be deformed during installation into the complicated shape of the bore passage, or even have a shape with an inconsistent thickness. On its side facing the liner, the flange collar itself preferably has the shape of a channel adapted to the shape of the bore passage, which is shaped according to an intersection curve resulting from the diameter of the circular bore and the diameter of the likewise circular conduit. The anti-rotation device between the pipe clamp and the pipe connection adapter—preferably two opposing flattened regions on these parts—ensures that the shape of the flange collar and the edge of the bore in the pipe match exactly during installation. Accordingly, a seal similar to an O-ring can be used, but it should have the shape of an oval ring because the annular shape of the circumference is not entirely circular, due to the shape of the intersection curve.

The pipe connection adapter and optionally other parts of the pipe connection system can be made of plastic injection molding. In such a case, it is also possible to attach the seal directly to the flange collar with a material bond, using a 2-component injection molding process. Particularly preferably, the outer leg of the channel which accommodates the seal, facing the liner, can be designed in such a manner that on the one hand it guides the seal securely, and on the other hand, because it extends almost to the liner, it almost completely closes off the annular space containing the seal. The seal, which rests against the inner edge of the bore from the inside of the pipe and seals the same, fulfills the task of sealing the connection both to prevent the discharge of the medium carried in the conduit into the open air, and also to prevent the medium from penetrating between the layers of the pipe sheathing.

In this embodiment of the invention, the pipe connection adapter is inserted from the inside of the pipe into the bore, and thus inserted into the pipe clamp, and is brought into the precisely fitting position by the anti-rotation device. This can be done, according to the method for producing the pipe connection, via an end or an opening of the pipe by means of a duct rodder with pulling head, a pull-in spiral, or a pipe robot, which bring the pipe connection adapter into a position that can be inserted into the bore. The pipe connection adapter has an external thread, via which a threaded nut supported on the pipe clamp presses the pipe connection adapter with its flange collar onto the liner via the seal, wherein the connecting pipe can optionally be connected to the pipe connection adapter by means of a swivel nut screwed onto the external thread.

In a further advantageous embodiment of the invention, the pipe connection adapter can be flexibly variable in diameter in its end region facing the pipe interior. It is preferably made of a rigid yet flexible material, preferably plastic. It can be provided with slots in the end region to form flexible webs. The webs also separate the flange collar into individual segments. These can have lead-in bevels which are designed to compress the flange collar, by sliding contact with the bore wall, to the bore diameter when it is inserted into the bore from the outside. Due to their flexibility, they spring back into their original position—that is, outwards—after they have passed through the bore, and form a flange collar interrupted by the slots. The flange collar is made complete again by a flexible elastic sheathing provided at least in the end area, which optionally fills in the slots and forms the seal.

The sheathing, which is preferably made of an elastomer, can be connected to the pipe connection adapter with a material bond in a 2-component injection molding process, such that the connection between them is not broken under reasonable pressure-, tensile- or shear forces. It can also fill in the slots between the webs of the pipe connection adapter. When compressed, these regions deform slightly, but return to their finished position after expansion.

Another preferred embodiment is to manufacture the pipe connection adapter with an end region that is tapered in such a manner that the flange collar in this state has a diameter that is equal to or smaller than the bore diameter. The pipe connection adapter can therefore be inserted into the bore from the outside without resistance and without deformation. The expansion into the final state in which the flange collar, together with the seal, engages behind the bore can then take place by means of an inner sleeve which is inserted from the outside into the pipe connection adapter and fixed there. The optionally overmolded sheathing then expands accordingly.

The above and other features emerge from the claims and also from the description and the drawings, with the individual features being implemented individually or in combination in the form of sub-combinations in one embodiment of the invention and in other fields, and can be advantageous designs which can represent protectable designs in and of them-selves. The subdivision of the application into individual sections and sub-headings does not restrict the general validity of the statements made under these.

BRIEF DESCRIPTION OF THE DRAWINGS

Embodiments of the invention are shown in the drawings and are explained in more detail below. In the drawings:

FIG. 1 is a longitudinal section through a conduit having a liner and having a pipe connection according to the invention, FIG. 1a is a detail from FIG. 1, FIG. 2 is a cross-section taken along the line II-II in FIG. 1, FIG. 3 is a side view of a pipe connection adapter with a slotted end region prior to overmolding with the sheathing according to FIG. 4, FIG. 4 is a side view, corresponding to FIG. 3, of the elastomeric sheathing, FIGS. 5 and 6 are the parts shown in FIGS. 3 and 4, in an oblique view, FIG. 7 is a plan view of the pipe connection adapter, FIG. 8 is a side view in one half and a section along the line VIII-VIII in FIG. 7 in the other half, FIG. 9 is a plan view corresponding to FIG. 7, FIG. 10 is a longitudinal section through the pipe connection adapter with overmolding through the sheathing.

DETAILED DESCRIPTION OF PREFERRED EMBODIMENTS

Figure 11:
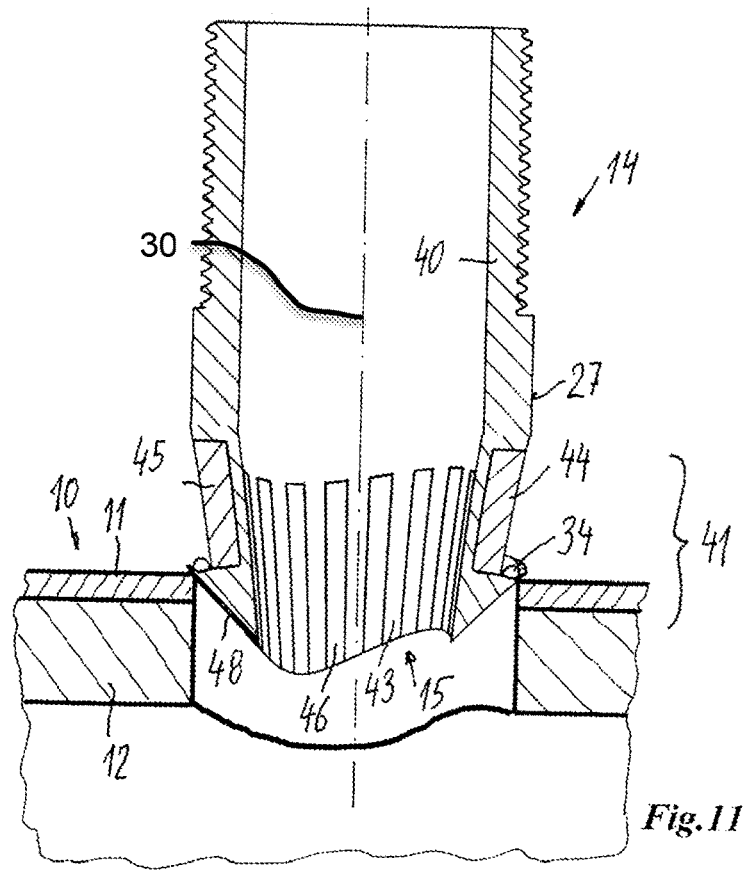
FIG. 11 is a longitudinal section through the pipe connection adapter according to FIG. 10, during insertion into a bore in the conduit.

FIGS. 1 and 2 show a conduit 10, for example a main pipe of a drinking water line, which consists of a pipe 11 made of metallic material, lined on the inside with a liner 12 for remediation. By means of the liner process, complex conduit systems can be permanently remediated without excavation. In this process, a hose liner, for example a fiberglass-reinforced needle felt hose, the length of which corresponds to the total pipe length to be remediated, is impregnated with a curing plastic such as epoxy resin and reverse-drawn via a reversion drum into the conduit being remediated. After curing, however, all branches and pipe connections, for example out-going lines for house connections, must be set again.

Such a pipe connection is shown in FIGS. 1 and 2 in the form of a pipe connection system 13 according to the invention. A bore 21 is drilled into the conduit 10—that is, through the pipe 11 and the liner 12—for the pipe connection. A special tapping saddle can be used as a guide for this purpose. The pipe clamp 13 described below has a pipe connection adapter 14 which has a cylindrical shape, with a flange collar 15 at one end and an external thread 16 at the other end. A connecting pipe 19 can be attached in a flush, sealing manner via this external thread 16 by means of a swivel nut 17 and end-face seal 18. A shut-off valve, for example a ball angle valve or the like, can also be connected in such a case.

The pipe connection adapter 14 protrudes through a pipe clamp 20, which is placed on the outside of the pipe 11 to match the bore 21 and is optionally securely located and aligned on the pipe 11 by means of a clamping strap 22. The clamping strap 22 ends on both sides in a threaded rod 23 which extends through a guide 24 on each of the arms 25 of the pipe clamp 20 forming retaining brackets, and can be tightened there by means of a tensioning nut 26. The pipe connection adapter 14 is guided to glide in the pipe clamp 20 in its longitudinal direction, specifically in its central guide region 27, which has a slightly larger diameter than the external thread 16 (see FIGS. 3 and 5 in this regard). In this region, and also beyond the external thread, a flattening 28 is provided which, together with a corresponding design in the pipe clamp 20, forms an anti-rotation device 29 for the pipe connection adapter 14 in the pipe clamp 20. The pipe connection adapter 14 is thus not only aligned via the pipe clamp 20 with its axis 30 at a right angle to the pipe axis 31, but is also secured with regard to rotation about its axis 30. The anti-rotation device can also be implemented by a projection on the pipe connection adapter 14 and a corresponding groove in the pipe clamp. This would make it possible for a drilling tool to be guided through the pipe clamp.

As FIGS. 1 and 2 and, in particular, FIG. 1a show, the flange collar 15 has an outer diameter which is greater than the diameter of the bore 21 and the cross-section of a channel 32 with an outer leg 33. A seal 34 similar to an O-ring is situated in the channel. In the circumferential direction of the pipe connection adapter 14, however, the flange collar 15 and thus also the channel 32 which accommodates and guides the seal has a curved shape, namely the shape of the intersection curve of the bore through the wall of the conduit 10. As a comparison of FIGS. 1 and 2 shows, it falls on each side from a curve apex 35 at the point at which the bore 21 inter-sects the central shell line of the pipe to the curve nadir 36 which can be seen in FIG. 2. As a result, the seal 34 carried and guided by the flange collar 15 always lies exactly on the edge of the bore and seals the pipe connection adapter 14 with respect to the liner. For this purpose, the pipe connection adapter 14 introduced into the bore 21, just like the bore, is sealed with respect to a medium flowing in the pipe. As such, no medium can get to the cut surface of the bore and penetrate into a gap between the pipe 11 and the liner 12, which could lead to the layers becoming detached.

The following process is used to install the pipe connection system 13: The pipe connection adapter 14 with the seal 34 inserted or attached is guided to the bore 21 and inserted therein from an open pipe end or another opening in the conduit 10 by means of a guide/inserter G/I (FIG. 1) that may be a known duct rodder with pulling head, a pull-in spiral with a pipe robot, or with a cable through the pipe interior. In the process, the pipe connection adapter 14 aligns itself, as a result of the anti-rotation device 29 formed by its flattening 28 and the corresponding flattening in the pipe clamp, exactly such that the flange collar 15, and thus the seal 34, lie exactly on the bore edge of the liner 12, which is curved in the shape of the intersection curve.

Then a tensioning nut 37 surrounding the pipe connection adapter is screwed onto the external thread 16. It lies against a clamping surface 58 of the pipe clamp 20 and clamps the pipe connection adapter 14 with the flange collar 15 against the inside of the liner 12. The originally circular cross-section of the seal 34 is deformed somewhat into an oval. The leg 33 of the channel 32 can extend almost or completely to the inner side of the liner 12, and can thus form an almost-closed sealing channel protecting the seal. Next, the connecting pipe 19 or other connection parts can be attached to the end face of the now-outer end of the pipe connection adapter 14 via the swivel nut 17 and seal 18. It is essential that the pipe connection adapter 14 is manufactured to match the pipe diameter of the conduit 10 and its own diameter, so that its flange collar follows the intersection curve resulting from these two diameters. Furthermore, the pipe clamp should be placed exactly centered on the bore.

Since it is possible and sensible to manufacture both the pipe connection adapter and other parts of the pipe connection system from plastic injection molding due to the suitable design, the pipe connection system is very economical not only in terms of installation, but also in terms of the parts required.

The following embodiments of the invention described with reference to FIG. 3 to 12 make it possible to install the pipe connection adapter 14 from the outside of the conduit 10. With the rest of the structure of the pipe clamp etc. being the same, a pipe connection adapter 14 is used which is composed of two components of different materials. The main body 40 of the pipe connection adapter 14 shown in FIGS. 3 and 5 has the external thread 16 and the central guide region 27. Its end region 41, which later faces the inside of the pipe, is, however, slotted several times in the longitudinal direction, such that webs 43 interrupted by slots 42 are formed. The slots also continue through the flange collar 15, such that the webs have an outwardly-facing hooked shape. The main body 40 consists of a material, preferably plastic, that is rigid in shape but sufficiently flexible that the webs can be bent inwards without suffering lasting deformations. For this purpose, the webs are also reduced in their thickness so that they can withstand the tensile stress caused by the later tension.

FIGS. 4 and 6 show a second component of the pipe connection adapter 14, specifically an elastomer body 44. It is designed in such a manner that it supplements the main body 40 to form the finished pipe connection adapter 14, as shown in FIG. 7 to 10. Accordingly, it has an annular body 45 which fills in the space between the guide region 27 and the flange collar, and it has ribs 46 on its inner side which fill in the slots 42 and thus also the gaps in the flange collar 15. On the sealing side of the flange collar 15, the elastomer body 44 has a closed, circumferential sealing region 47 which forms the seal 34 (see FIGS. 8 and 10).

These figures show that the two components complement each other to form the pipe connection adapter. FIG. 8 shows the section through the ribs 46 in the right half of the drawing. In this portion, the end area 41 is therefore entirely made of elastomer, while FIG. 10 shows the section through the flexible web 43 of the main body 40. In this region, the elastomer body 44 forms a ring around the relatively thin, flexible arms of the web 43 and the sealing region 47 with the seal 34, which is designed as a semicircular circumferential rib. The main body 40 and the elastomer body 44 are preferably produced using a 2-component injection molding process—that is, the main body is overmolded with the elastomer body and forms a sheathing 38 for the main body. In addition to their primary proper-ties, namely structural strength in the main body and elasticity in the elastomer body, the material and the injection parameters are chosen in such a manner that both components enter into a material bond during the injection molding process—that is, they do not separate from each other when subjected to the pressure-, tensile- and shear loads which arise.

The flange collar 15—that is, both the ends of the webs 43 and the ribs 46—are beveled in order to create a glide surface 48. As FIG. 11 shows, when the pipe connection adapter 14 is inserted into the bore 21, the end region 41 is compressed by the glide surface 48 in order to reduce the diameter of the flange collar to the bore diameter. In the process, the elastomer parts—that is, in particular the ribs 46 between the webs 43, are pressed together with elastic deformation. After the bore 21 has been traversed, the end region 41 springs apart again so that the flange collar 15 with the seal 34 engages in the liner 12 behind the edge of the bore, and the seal 34 is made effective by means of the tensioning nut 17 tightening the pipe connector 14. The cylindrical portion of the elastomer body 44 then also lies against the inner surface of the bore, sealing the same. Although such a seal against the medium in the pipe is not necessary, it is useful against the ingress of moisture from the outside.

Figure 12:
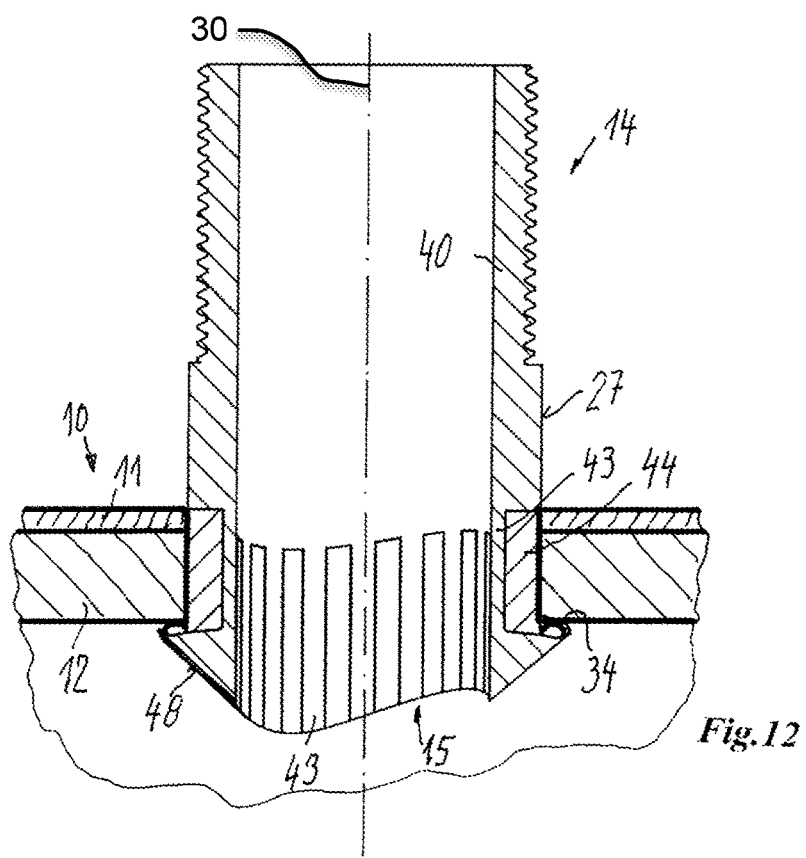
FIG. 12 is a longitudinal section according to FIG. 11, after insertion.

A further advantageous variant can also be explained with reference to FIGS. 11 and 12: the pipe connection adapter 14 can be produced with an already-tapered end region, as shown in FIG. 11. Since the pipe connection adapter 14 can now be inserted into the bore with no force, fitting therein, the flange collar no longer needs the glide surface 48 either, such that it can have a radial end surface as in FIG. 1. This is advantageous because it reduces the cross-section of the conduit less. After the pipe connection adapter with the flange collar has been inserted through the bore, it can be expanded to an end position as shown in FIG. 12 by means of a thin-walled cylindrical sleeve, not shown, which is inserted into the pipe connection adapter 14 from the outside and fixed in its position. The elastomer body 44 is stretched in the process, but continues to seal.

LIST OF REFERENCE SIGNS

Conduit 10
Pipe 11
Liner 12
Pipe connection system 13
Pipe connection adapter 14
Flange collar 15
External thread 16
Swivel nut 17
End-face seal 18
Connecting pipe 19
Pipe clamp 20
Bore 21
Clamping strap 22
Threaded rod 23
Guide 24
Arms 25
Tensioning nut 26
Central region 27
Flattening 28
Anti-rotation device 29
Axis 30
Pipe axis 31
Channeling 32
Leg 33
Seal 34
Curve apex 35
Curve nadir 36
Tensioning nut 37
Sheathing 38
Main body 40
End region 41
Slots 42
Webs 43
Elastomer body 44
Annular body 45
Ribs 46
Sealing region 47
Glide surface 48
Clamping surface 58

The invention claimed is:

1. A method for producing a pipe connection using a pipe connection system having a pipe clamp to be placed on an outside of a conduit equipped with a liner, having a pipe connection adapter which can be connected to a connector, which penetrates a bore in a wall of the conduit, the conduit being multilayered as a result of the liner, the pipe connection adapter having a flange collar with a greater diameter than the bore, and having a seal between an inner wall surface of the conduit and the pipe connection adapter, wherein the flange collar has, on its side facing the liner, the shape of an intersection curve of the bore in the conduit in a circumferential direction of the flange collar, and in that the pipe connection adapter has an anti-rotation device with respect to the pipe clamp, and wherein a diameter of the pipe connection adapter is flexibly variable in an end region facing an inside of the conduit, the pipe connection adapter is provided with slots on the end region with the flange collar, to form flexible webs, and a flexible elastomeric sheathing fills at least the slots, wherein the pipe connection adapter is inserted into the bore in a tapered state on its end region by inserting the pipe connector adapter from the outside into a position wherein the sheathing expands, and then is brought under axial tension towards the outside into a sealing position which presses the flange collar via the elastomeric sheathing, acting as the seal, against the liner.

2. The method for producing a pipe connection according to claim 1, wherein the pipe connection adapter is brought, via an end or an opening of the conduit, by means of a duct rodder with a pulling head, a pull-in spiral, a pipe robot, or a cable, into a position which can be inserted into the bore.

3. The method for producing a pipe connection according to claim 2, wherein on the flange collar, on its side facing the liner, is a channel which accommodates the seal which is designed in the manner of an O-ring, and an outer leg of the channel substantially covers the seal in a sealing state.

4. The method for producing a pipe connection according to claim 2, wherein the pipe connection adapter has an external thread via which a tensioning nut supported on the pipe clamp presses the pipe connection adapter with its flange collar against the liner via the seal, the connector optionally being connectable to the pipe connection adapter by means of a swivel nut screwed onto the external thread.

5. The method for producing a pipe connection according to claim 2, wherein the pipe connection adapter and optionally further parts of the pipe connection system are made of plastic formed by injection molding.

6. The method for producing a pipe connection according to claim 2, wherein the pipe connection adapter is designed to attach the seal for insertion into the bore from the inside of the conduit.

7. The method for producing a pipe connection according to claim 2, wherein the pipe connection adapter has glide surfaces with lead-in bevels on its end region, which are designed to compress the flange collar, in contact with a wall around the bore, to a diameter of the bore upon insertion into the bore.

8. The method for producing a pipe connection according to claim 2, wherein the sheathing has at least one of the following features:
  a) it surrounds the flange collar on a seal-forming side,
  b) it is permanently connected with a material bond to the pipe connection adapter, or
  c) it is produced in a 2-component injection molding process.

9. The method for producing a pipe connection according to claim 2, wherein the end region of the pipe connection adapter, which is flexible in diameter, tapers inward in a ready-to-install state in such a manner that the flange collar has an outer diameter corresponding to a diameter of the bore.

10. The method for producing a pipe connection according to claim 2, wherein an inner sleeve can be inserted into the pipe connection adapter, and/or comprises an end region of the pipe connection adapter, wherein an outer diameter of the inner sleeve rests on an inner diameter of the pipe connection adapter, and fixes the pipe connection adapter in a form-fitting position in which the flange collar has a greater outer diameter than the bore.

11. The method for producing a pipe connection according to claim 2, wherein the flange collar of the pipe connection adapter is compressed, in contact with a wall around the bore, to a diameter of the bore via a glide surface with lead-in bevels provided on its end region when it is inserted into the bore.

* * * * *